Patented Feb. 22, 1938

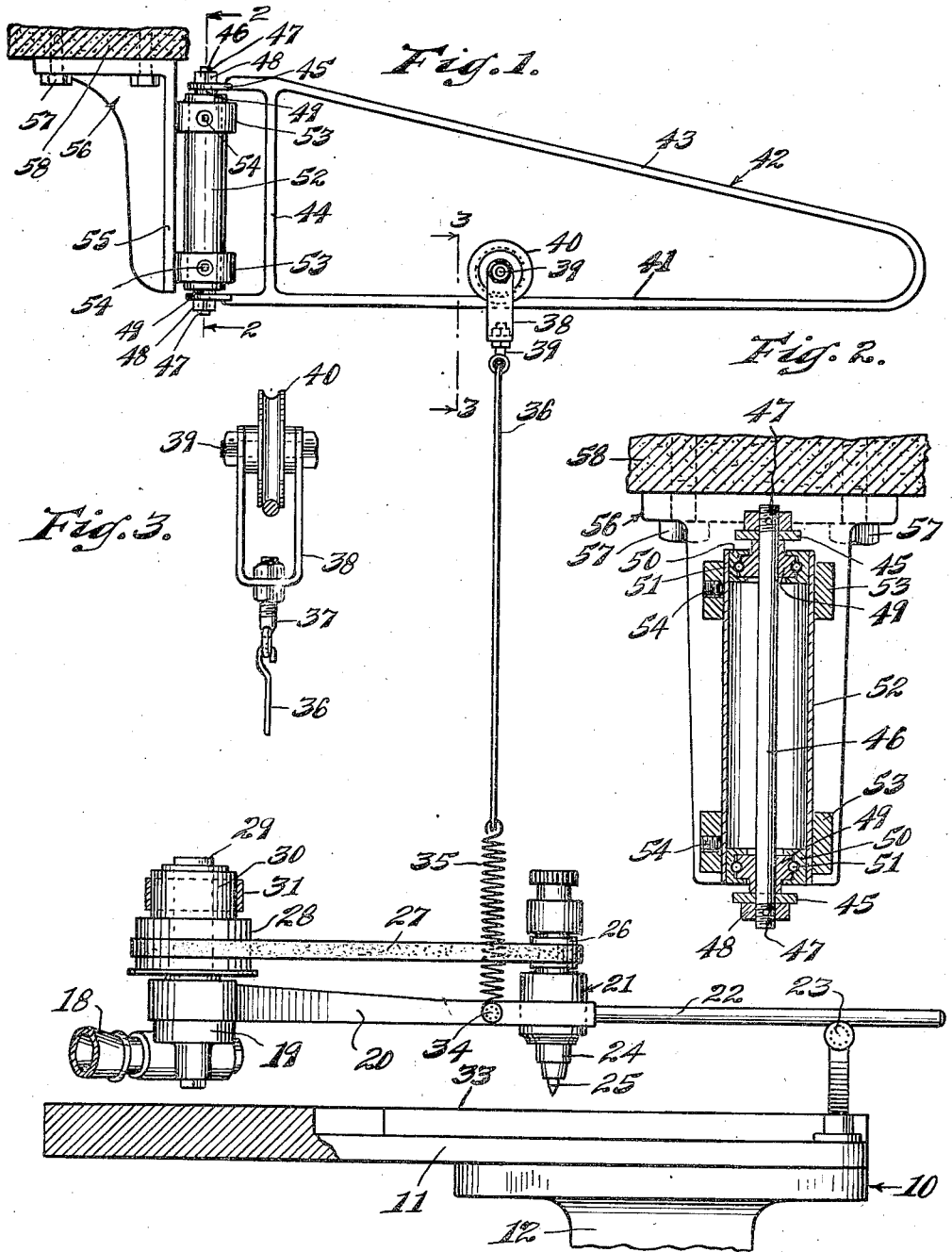

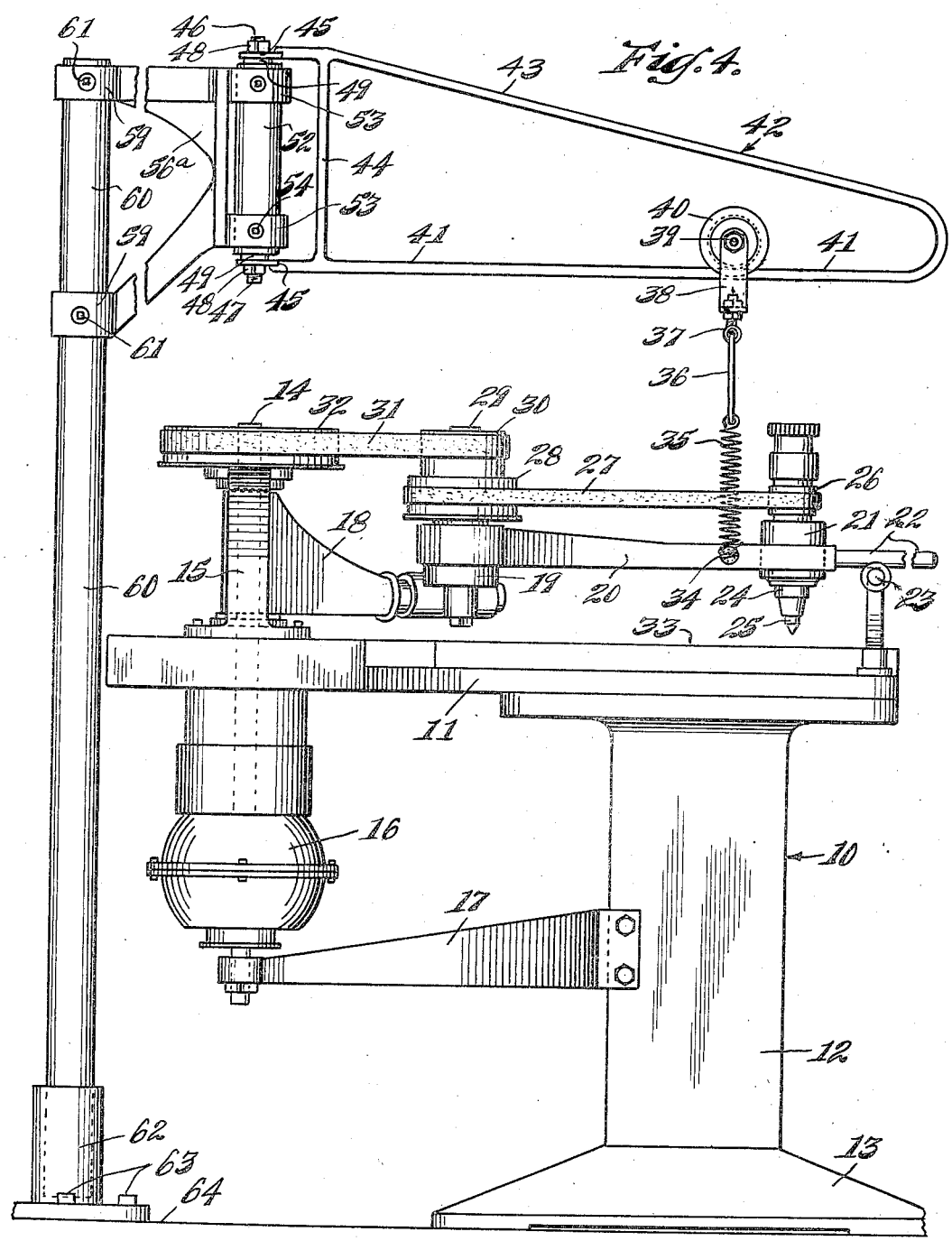

2,109,263

UNITED STATES PATENT OFFICE 2,109,263

HEAD SUPPORT FOR ROUTING MACHINES

Alphonzo B. Eckersall, Chicago, Ill.

Application September 16, 1936, Serial No. 101,024

6 Claims. (Cl. 90—15)

This invention relates to routing machines, and more especially to means for supporting the router head of such machines.

An important characteristic of router heads for engravings and printing plates is that the head should be freely movable over the plate to be grooved or routed, and in machines as constructed, the weight of the head is carried by a cutter bar which moves over a guide rail and in practice it is found that an appreciable amount of friction is developed at the point of support which interferes with the free movement of the router head. It is to overcome this friction that my present invention has been conceived and developed, and my improvements to this end include the support of the router head from above, independent of the routing machine. I do this by the arrangement of a freely adjustable supporting bracket suspended from a ceiling or from a stanchion secured to the floor or wall of the room structure. In this manner substantially all of the weight of the router head may be carried by the said support which is adjustable in a substantially frictionless arrangement permitting the router to be operated practically free of any friction.

It is therefore the general object of my invention to provide simple and inexpensive means for achieving the results as stated hereinabove.

Other objects and advantages will appear and be brought out more fully in the following specification, reference being had to the accompanying drawings wherein;

Fig. 1 is an elevation view illustrating my invention.

Fig. 2 is a sectional elevation taken along the line 2—2 of Fig. 1.

Fig. 3 is a similar view taken along the line 3—3 of Fig. 1, and

Fig. 4 is a view substantially similar to Fig. 1 showing a modified means of support.

Referring more particularly to the drawings, I show a routing machine 10 having a work table portion 11, a supporting pedestal 12 and a base 13. A vertical power shaft 14 mounted in a bearing bracket 15 is rotatable by a motor 16, which in turn is supported by a bracket 17 suitably secured to pedestal 12. An arm 18 is pivotally mounted at one end to bearing bracket 15 and is provided with a swivel yoke 19 at its other end. Yoke 19 pivotally supports one end of a router head supporting arm 20, the free end of which carries a router head 21, the supporting arm having an extension rod or cutter bar 22 which is freely movable along and over a guide rail 23 which is suitably secured to table 11. The router head forms a bearing for a spindle 24 which in turn carries a router bit 25. Pulley 26 is secured to spindle 24 and is rotatable by belt 27 from a pulley 28 mounted on a vertical shaft 29 carried by the yoke 19. A pulley 30 is also secured to shaft 29 and is rotated by a belt 31 from a pulley 32 secured to power shaft 14. Table 11 is provided with the usual work plate 33 over which the router head 21 and the bit 25 are adapted to move in a universal free motion.

Cutter bar 20 is provided with a bolt 34 which is connected to a spring 35, the latter being secured to a supporting rod 36, the upper end of which is secured to an eyelet bolt 37 supported by a U-shaped bracket 38. A stud shaft 39 supports bracket 38 and is carried by a grooved pulley 40 which is adapted to travel along a rail 41 of a pivoted bracket 42. Bracket 42 has an angular supporting arm 43, a tie brace head 44 and a pair of flat, apertured lugs 45 adapted for the reception of a shaft stud 46 having threaded ends 47 which, together with lock nuts 48 secure lugs 45 to stud 46 and to a bearing member 49. A fixed bearing head 50 carries a ball race 51 and is secured to a tube 52 to a pair of lugs 53, set screws 54 being employed to secure tube 52 to lugs 53. Lugs 53 are supported by a vertical arm 55 of a supporting bracket 56 which is secured as by bolts 57 to a ceiling 58.

In Fig. 4 I show modified means for supporting bracket 42 and show instead of bracket 56 a bracket 56a which has a pair of lugs 59 secured to the upper end of a stanchion 60 by set screws 61. Stanchion 60 is supported by a flanged base 62 which is suitably secured by bolts 63 to the floor 64.

The operation of my invention should be clear from the foregoing description, it being obvious that the bracket 42 is free to swing about the vertical pivot of bearings 49 and 50, and that the bracket 38 which may carry any or all of the weight of router head 21 is free to move back and forth along rail 41, and that the movement of bracket 38 will follow router head 21 in its movement over work plate 33 in a practically frictionless manner. Thus the routing operations can be carried out without any difficulty due to friction or dragging of the cutter bar 22 along the guide rail 23. The means for mounting the router may, as described, also reduce the friction of the pivot mounting for arm 20 in yoke 19 and in the mounting of arm 18 in the bearing bracket 15. While I have shown the bracket 42 mounted on the floor and ceiling respectively, it will be apparent that the brackets 56 or 56a could readily be adapted to side wall or other convenient portion of the building structure if desired.

While I have illustrated and described the preferred form of construction for carrying my invention into effect; this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The combination with a routing machine for printing plates and the like, having a universally adjustable router head, of supporting means for said head on said machine, and supplementary supporting means for said head independent of said machine, said supplementary supporting means including a trolley and a self-adjusting track for said trolley.

2. The combination with a routing machine for printing plates and the like, having a universally adjustable router head, of supporting means for said head independent of said machine, said supplementary supporting means including a trolley, a self-adjusting track for said trolley and a bracket for said track adapted to be mounted on a structural member of an enclosing room.

3. The combination with a routing machine for printing plates and the like, having a universally adjustable router head, of supporting means for said head on said machine, and supplementary supporting means for said head independent of said machine, said supplementary supporting means including a trolley, a self-adjusting track for said trolley and a bracket for said track adapted to be mounted on a ceiling member of an enclosing room.

4. The combination with a routing machine for printing plates and the like, having a universally adjustable router head, of supporting means for said head on said machine, and supplementary supporting means for said head independent of said machine, said supplementary supporting means including a trolley, a self-adjusting track for said trolley and a bracket for said track adapted to be mounted on a stanchion secured to the floor of an enclosing room.

5. The combination with a routing machine for printing plates and the like, having a universally adjustable router head supported thereon, of supporting means for said head independent of said machine, said supplementary supporting means including a trolley, a horizontal self-adjusting track for said trolley and a bracket for said track adapted to be mounted on a structural member of an enclosing room.

6. The combination with a routing machine for printing plates and the like, having a universally adjustable router head supported thereon, of supporting means for said head independent of said machine, said supplementary supporting means including a trolley, a horizontal self-adjusting track for said trolley and a bracket for said track adapted to be mounted on a structural member of an enclosing room said bracket being pivoted about a vertical axis.

ALPHONZO B. ECKERSALL.